Sept. 28, 1965    W. T. WALTERS ETAL    3,209,243
MAGNETIC FLAW DETECTION DEVICES
Filed Sept. 21, 1961    4 Sheets-Sheet 1

INVENTORS
William T. Walters &
Mahan L. Reeme

BY Arnold & Roylance

ATTORNEYS

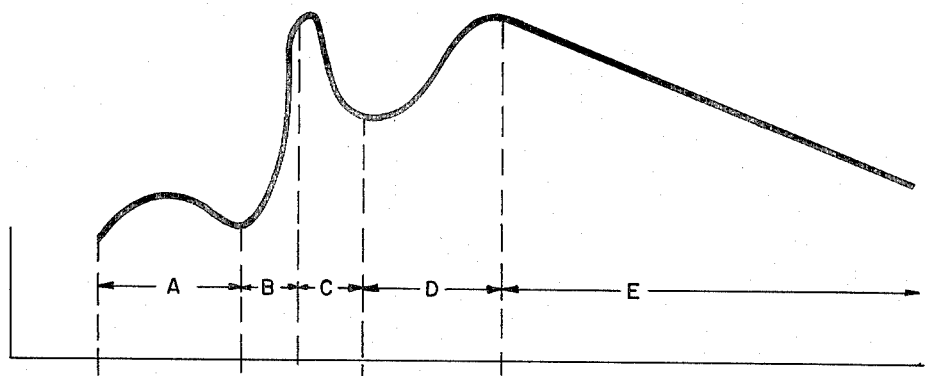
FIG. 4a.
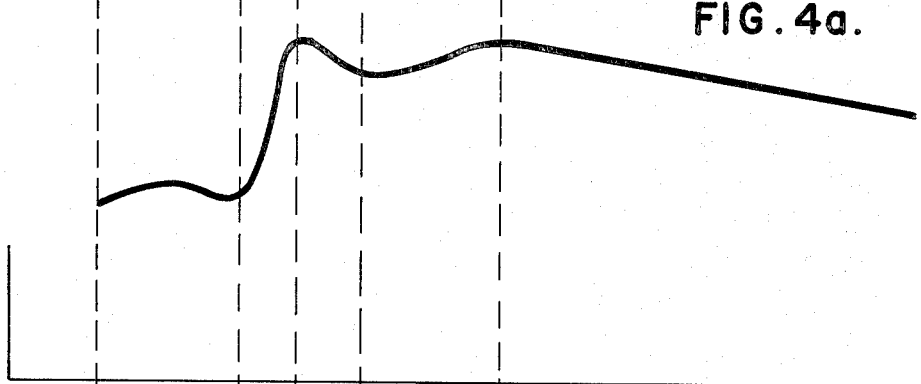
FIG. 4b.
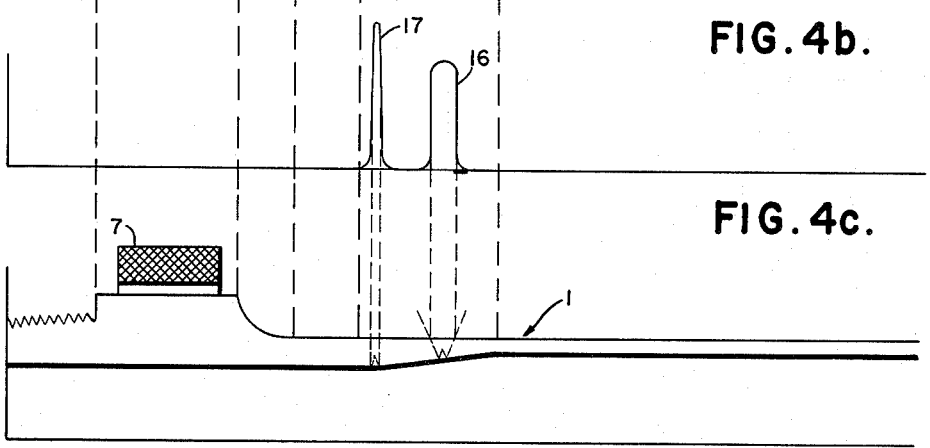
FIG. 4c.
FIG. 4.
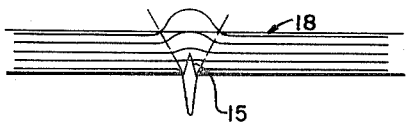
FIG. 5.
INVENTORS
William T. Walters &
Mahan L. Reeme
BY
ATTORNEYS

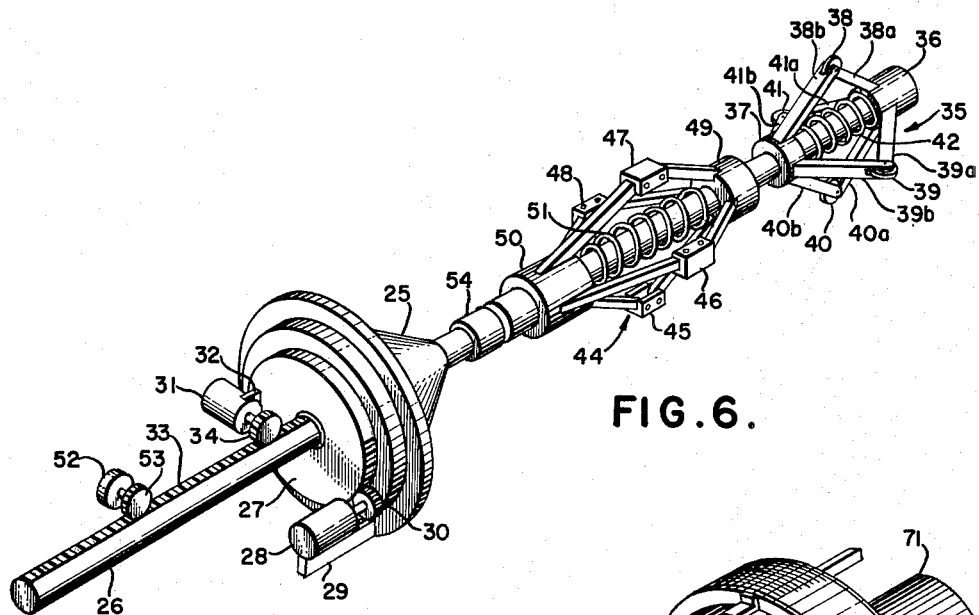

Sept. 28, 1965 W. T. WALTERS ETAL 3,209,243
MAGNETIC FLAW DETECTION DEVICES
Filed Sept. 21, 1961 4 Sheets-Sheet 4

INVENTORS
William T. Walters &
BY Mahan L. Reeme
Arnold & Roylance
ATTORNEYS

United States Patent Office 3,209,243
Patented Sept. 28, 1965

3,209,243
MAGNETIC FLAW DETECTION DEVICES
William T. Walters and Mahan L. Reeme, Houston, Tex., assignors, by mesne assignments, to American Machine & Foundry Company, New York, N.Y., a corporation of New Jersey
Filed Sept. 21, 1961, Ser. No. 139,683
13 Claims. (Cl. 324—34)

This invention relates to magnetic testing and more particularly to method and apparatus for magnetic detection of surface discontinuities in ferromagnetic members having a non-uniform cross section. This invention finds particular utility in detecting interior fatigue cracks and like discontinuities located at the upset or relatively thick end portions of drill pipe, but is by no means limited to such use since the invention can be used to detect cracks or similar discontinuities in other flat or tubular ferromagnetic members.

The advantages of this invention can best be understood when explained with reference to drilling operations and drill pipe. During drilling operations, the surfaces of the drill pipe are continuously exposed to corrosive drilling fluids and eventually corrosion occurs, causing pits in the surface. Subsequently, when the pipe is stressed, stress concentrations build up around the pits, often resulting in fatigue cracks at these points. Normally, fatigue cracks are found only on the interior surface of the pipe since the outer surface is continuously wiped clean. During the drilling operation, the outer surface is wiped by the scraping action resulting from the rotation and flexing of the drill pipe and, during the removal of the pipe from the well, the surface is wiped by a surrounding rubber wiper ring. Also, the corrosive fluids are removed from the exterior surface by fresh water washing after removal of the drill pipe from the well.

It has been demonstrated that fatigue cracks and similar discontinuities can be detected by establishing longitudinal magnetic flux in the pipe and noting the pattern of flux leakage from the surface. A crack causes increased density of flux leakage in the immediate area of the crack, and the increase in flux density can be detected to indicate the location of the discontinuity. Past systems based on this principle of operation have been successful in detection of cracks and other discontinuities located in the long uniform cross section portion of the drill pipe but have not been useful to detect similar flaws in the upset or relatively thick end areas. The reason for this is that the end area increases the cross section in a non-uniform manner which materially affects the pattern of flux leakage, resulting in ambiguous indications.

An object of this invention is to provide a method and apparatus for detecting surface discontinuities, such as fatigue cracks, in ferromagnetic members having a non-uniform cross-sectional area.

Another object is to provide a method and apparatus for establishing a reasonably uniform longitudinal magnetic flux density in a ferromagnetic member of a non-uniform cross-sectional area.

A further object is to provide a method and apparatus of the type referred to which is operative to sense changes in flux leakage caused by discontinuities, such as cracks, but relatively insensitive to changes in leakage flux caused by non-uniform cross-sectional areas.

Still another object is to provide a method and apparatus for magnetically detecting interior fatigue cracks existing at the upset or relatively thick end area of a length of drill pipe.

Another object is to provide a method and apparatus for magnetically detecting the depth of cracks with a uniform response all along the length of a ferromagnetic member having a non-uniform longitudinal cross-section.

In order that the manner in which these and other objects are attained in accordance with the invention can be understood in detail, reference is had to the accompanying drawings, which form a part of this specification, and wherein:

FIG. 4 is a fragmentary longitudinal cross-sectional view of the wall of an end portion of a length of drill pipe;

FIGS. 4a and 4b are graphical representations, co-ordinated in position with respect to FIG. 4, representing typical fluix density detections in the wall of the drill pipe, FIG. 4b including the effect of the additional coil of FIG. 2;

FIG. 4c is a graphical representation of typical flux leakage detections made with the method and apparatus of the present invention;

FIG. 5 is a diagram illustrating the disposition of lines of flux in the immediate location of a crack in the surface of a ferromagnetic member;

FIGS. 6 and 7 are isometric views showing in detail certain structural features embodied in apparatus embodiments of the invention;

FIG. 8 is a diagram showing the configuration of a pickup coil useful in accordance with the invention.

In accordance with the method of the present invention, a ferromagnetic member to be inspected, such as a length of drill pipe having an upset relatively thick end portion, is magnetized longitudinally in the area of the relatively thick end portion. The area at the surface of the member which is to be inspected, such as the inner surface of the drill pipe, is then scanned magnetically to detect leakage flux, and electrical signals are generated in accordance with the leakage flux encountered. Since leakage flux results both from the variation in thickness of the member being inspected and from the cracks or other discontinuities to be detected, signals representative of both result. More specifically, changes in wall thickness give rise to relatively long pulses consisting primarily of low frequency components, whereas cracks give rise to relatively short pulses consisting primarily of higher frequency components. The signals of higher frequency are then selectively recovered as meaningful indications of the presence of cracks or like discontinuities in the surface being inspected.

Figure 1:
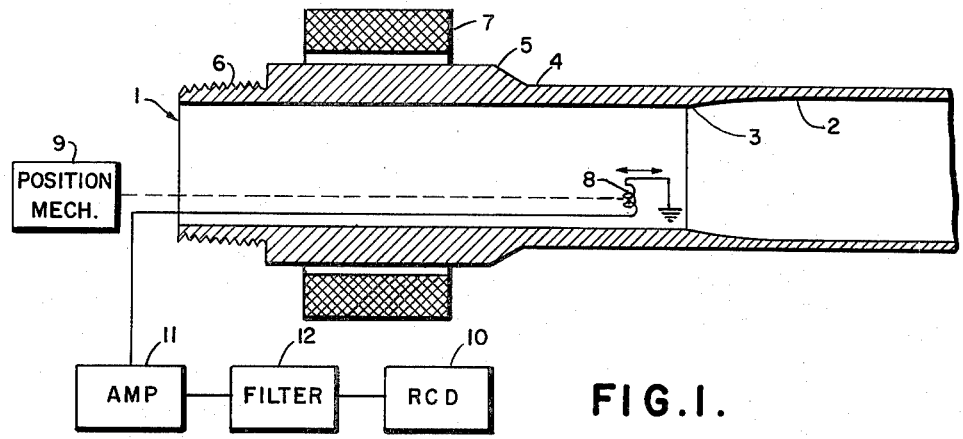
FIG. 1 is a schematic diagram illustrating one apparatus embodiment of the invention in operative relation with respect to the upset end portion of a piece of drill pipe, the latter being shown in longitudinal cross section.

One typical apparatus embodiment for carrying out the method in detection of fatigue cracks in the end portion of drill pipe is shown in FIG. 1. The cross section of the drill pipe 1 is uniform in that portion which extends from the right-hand side of the diagram and therefore only the end portion having the non-uniform cross section is shown. Moving from right to left, the inner diameter of the drill pipe decreases between points 2 and 3, the outside diameter increases between points 4 and 5, and the outside diameter changes very rapidly in the threaded area 6.

Electromagnetic coil 7, which can be energized from a suitable direct current source, is positioned surrounding the drill pipe. Coil 7 is approximately centered over the relatively thick portion of the pipe between the threaded area 6 and point 5 and advantageously has a width less than the length of this portion.

When a piece of ferromagnetic material, such as drill pipe 1, is inserted into the magnetic field of an electromagnetic coil, such as coil 7, the material becomes a magnet and sets up its own magnetic field. The field of coil 7 induces magnetic lines of flux, hereinafter referred to simply as magnetic flux, extending longitudinally in the ferromagnetic material. Since magnetic flux must make a complete circular path, the flux leaves the surfaces of the drill pipe at various points and re-enters the surface of the drill pipe at a point on the opposite side of the center of the electromagnetic coil. The magnetic flux leaving the surfaces (or returning thereto, as the case may be) is referred to as leakage flux.

A search coil or pickup coil 8 is mechanically connected to a positioning mechanism 9 which is operative to cause the pickup coil to move rapidly along the inner surface of the drill pipe in a longitudinal direction, as indicated by the arrows. Coil 8 is electrically connected to a galvanometer recorder 10 via amplifier 11 and high pass filter 12.

FIG. 4a shows the flux density in the wall along the length of the drill pipe when magnetizing coil 7 is positioned with respect to the drill pipe in the manner seen in FIG. 4.

For a given transverse cross section of the drill pipe the flux density is substantially uniform between the outer and inner surfaces of the wall. In area A, there is relatively little flux density, since the drill pipe is comparatively thick in this area. The flux density increases considerably in area B because of the squeezing of the total flux generated by the thick section A into the smaller cross-sectional area. In area C, the cross-sectional area remains constant but the flux density decreases. The drop in flux is the combined result of the distance from the thick section A and the distance from coil 7. In area D the flux rise is because the reduction in cross-sectional area more than offsets the increase in distance from coil 7. In area E, the cross section remains constant and therefore the flux density again decreases exponentially as the distance from coil 7 increases.

The pattern of magnetic flux in the drill pipe is substantially altered by a crack existing in the surface, as shown in FIG. 5. The crack 15 abruptly decreases the cross-sectional area of the ferromagnetic member 18, causing the magnetic flux to bulge and pass through the air, both above and below the pipe, as shown. The flux passes through the air for only a short distance on the surface containing the crack, but passes through the air to a lesser extent for a longer distance on the oppoosite surface. Accordingly, a pickup coil traversing the exterior surface of the pipe would sense a change of flux pattern 16, as shown in FIG. 4c, whereas a similar coil traversing the interior surface of the pipe would sense a much narrower change of flux pattern 17. It is advantageous to employ a pickup coil traversing the interior surface, since the change of flux pattern on the interior surface is much narrower and therefore can more easily be distinguished from the changes in leakage flux due to the non-uniform cross section, as shown in FIG. 4a.

The pickup coil 8 employed in FIG. 1 is a flat wound coil having a central axis substantially perpendicular to opposite interior surfaces of the pipe. Flat wound coils are preferred in this instance since they provide a large signal. However, other types of coils can be employed. The pickup coil produces electrical signals proportional to the changes in leakage flux emanating from the pipe surface, but is relatively insensitive to longitudinal flux produced directly by electromagnetic coil 7. The pickup coil senses changes in leakage flux caused by the non-uniform cross section, pits on the surfaces and fatigue cracks. Since it is desired to detect only the changes in flux caused by cracks or like discontinuities, special provisions must be made. Coil 8 is elongated, as shown in FIG. 8, so that the coil has a relatively narrow air gap in its direction of travel longitudinally of the pipe. This configuration makes the coil more sensitive to rapid changes in flux leakage as caused by the cracks than it is to more gradual changes in flux leakage caused by the non-uniform cross section and pits in the surface.

The moving search coil develops a relatively short electrical pulse when traversing a crack in the surface being scanned and develops a longer electrical pulse when traversing a change in flux leakage caused by the non-uniform cross section and pits in the surface. As an example, when the pickup coil is moving at approximately 50 feet/minute, major frequency components of the longer electrical pulse due to the non-uniform cross-section may be primarily in the range of 2 c.p.s. (cycles per second) to 20 c.p.s. The shorter pulse due to a crack may have major frequency components primarily in the range above 25 c.p.s. The exact frequency components of the two pulses depend, of course, on the speed of the pick up coil, the nature of the materials involved, and the pickup coil arrangement, but the major frequency content of the pulses remains essentially in the same relationship, i.e., the pulses caused by cracks will always include higher frequency components than the pulse caused by changes in cross section.

Since the shorter pulse contains higher frequency components than does the longer pulse, it is possible to separate the pulses by means of a high pass filter 12 which permits only the shorter pulses to reach recorder 10. Thus, the sensing circuit including pickup coil 8, amplifier 11, filter 12, and recorder 10 senses the cracks in the interior surface of the drill pipe but, because of the narrow air gap and the high pass filter, is relatively insensitive to changes in flux caused by the non-uniform cross section and pits in the surface.

The flux density in the pipe decreases as the distance from stationary electromagnetic coil 7 increases and hence, in many installations, it is difficult to sense changes in leakage flux in the remote low flux density areas. Also, since the amount of leakage flux around a crack varies with the flux density in the pipe wall, the signal response in the pickup coil for a given crack depth is not uniform when the flux denisty is not substantial uniform in the wall along the length of the pipe.

Figure 2:
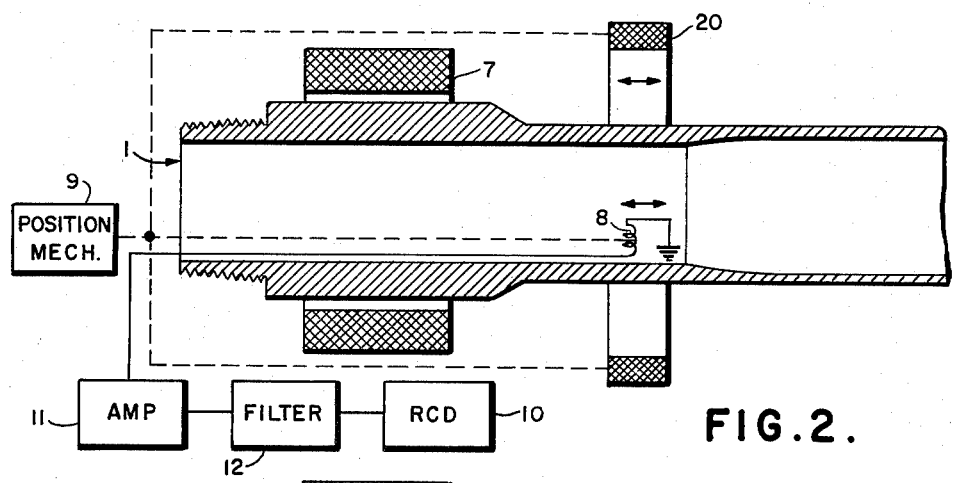
FIGS. 2 and 3 are schematic diagrams, similar to FIG. 1, illustrating additional apparatus embodiments of the invention.

A number of approaches can be used to make the flux density in the pipe adjacent the pickup coil substantially uniform as the pickup coil scans in a longitudinal direction along the pipe. In order to alter the flux density in the pipe when the flux is induced by a stationary coil, the apparatus shown in FIG. 2 can be employed. Many of the components shown in FIG. 2 are similar to those shown in FIG. 1, and therefore like reference numerals are employed. The flux density is increased in the remote areas by means of a movable electromagnetic coil 20 which is transversely aligned with pickup coil 8 and connected to the same positioning mechanism 9. Thus, as pickup coil 8 traverses the interior surface of the pipe, movable coil 20 simultaneously traverses the exterior surface.

The magnetic flux induced in the pipe by coil 20 is inversely proportional to the cross-sectional area of the pipe immediately within the coil, i. e., as the cross section of the pipe decreases, the density of the induced flux and the leakage flux increases, and vice versa. The flux density in the wall along the length of the pipe when coil 20 is added as shown in FIG. 2 is illustrated in FIG. 4b. The effect of the movable coil is to smooth the curve in areas C, D and E, making the changes in flux density more gradual and hence more easily distinguishable from the changes in magnetic flux caused by cracks. Also, the movable coil increases the flux density in the areas more removed from the stationary coil 7, permitting more sensitive inspection and improvement in response uniformity in these remote areas. If windings containing a like number of turns are employed, a ratio of energizing current for the stationary coil to the energizing current of the moving coil of approximately 2:3 has been found satisfactory, producing no substantial north-south pole between the windings.

Figure 3:
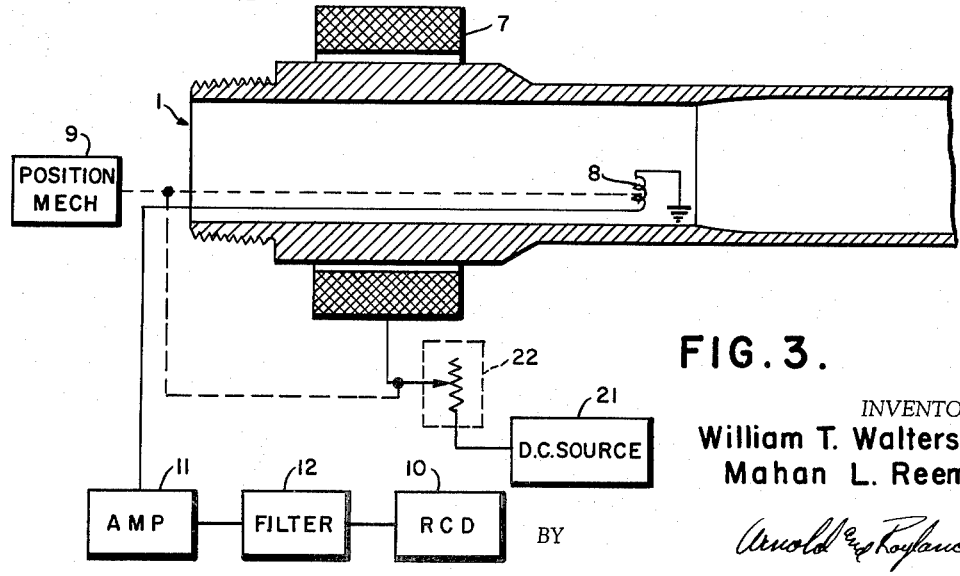

Another manner in which the flux density can be increased in the remote areas is by means of apparatus as shown in FIG. 3. Again, many of the components are similar to those employed in FIG. 1, and therefore similar reference numerals are employed. In this embodiment, the amount of direct current energy supplied to stationary coil 7 is varied in accordance with the position of pickup coil 8. D.C. source 21 provides energy for coil 7 via potentiometer 22. The movable contact of potentiometer 22 is physically connected to positioning mechanism 9 so that the resistance is decreased as the search coil moves away from the stationary coil 7. In this manner, more magnetic flux is induced in the drill pipe as the search coil moves away from the stationary coil 7.

Figure 9:
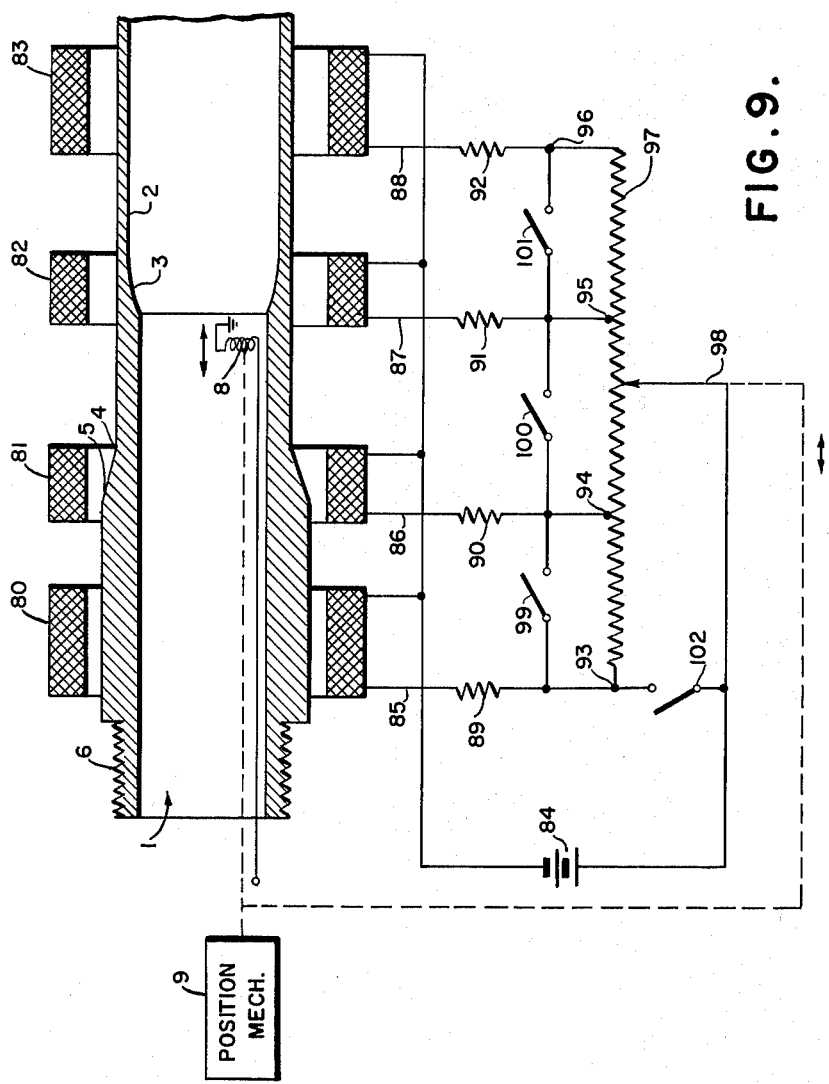
FIG. 9 is a schematic diagram, similar to FIG. 1, illustrating additional apparatus embodiments of the invention.

In another approach the magnetic flux density can be increased in the remote areas by means of apparatus as shown in FIG. 9. Again, many of the components are similar to those employed in FIG. 1, and therefore similar references are used. In this embodiment, the coil 80 corresponds to the stationary coil 7 in FIG. 1, disposed at the thick end of pipe 1 and surrounding pipe 1 in a coaxial manner. Coils 81, 82, and 83 are spaced along pipe 1 in the same coaxial relationship. Coil 81 is disposed substantial over the decrease in wall thickness between points 4 and 5. Coil 82 is disposed substantially over the decrease wall thickness between points 3 and 2, and coil 83 is disposed over a portion of pipe 1 where the wall thickness is constant.

Coils 80, 81, 82, and 83 are energized from a D.C. source 84 by connection of one side of each coil to a terminal of D.C. source 84 and the other sides 85, 86, 87 and 88 through separate sense resistors 89, 90, 91, and 92, respectively, to successive different taps 93, 94, 95 and 96 on a multiple tap resistor 97 having a movable tap 98. The tap 98 is connected directly to the other terminal of the D.C. source 84. Switches are provided that will be described further. Considering the circuit of FIG. 9 as if the switches are not present. When the movable tap 98 is positioned at one end of potentiometer 97, near tap 93, the current in coil 80 is limited only by the sense resistor 89. Coils 81, 82, and 83 have portions of the resistor 97, in addition to the respective resistors 90, 91, 92, in series between the source to substantially limit the current in the coils. As the tap 98 is moved towards the opposite end, i.e., toward tap 96, the portion of resistor 97 in series between the source 84 and coil 81 decreases, increasing the current in coil 81 and thereby increasing the flux density in the adjacent pipe wall. Movement of the tap 98 past tap 94 decreases the current in coil 81 and successively increases the current in coils 82 and 83 in a similar manner, thereby increasing the flux density adjacent coils 82 and 83. The pickup coil 8 is physically connected to the movable tap 98 to move toward each coil as the current is increased therein, whereby the flux density in the pipe wall is substantially uniform as the pickup coil 8 moves along the inside of the pipe 1 in a longitudinal direction.

The arrangement of FIG. 9 can be modified to present another illustrative embodiment for producing a substantially uniform flux density in the pipe wall as the leakage flux is sensed along the longitudinal direction of a ferromagnetic member. The only changes in considering FIG. 9 are in the addition of switches 99, 100 and 101, connecting respectively the fixed taps 93 and 94; 94 and 95; and 95 and 96 together when the switches are closed and switch 102 connecting tap 93 directly to the same terminal of the source 84 as the movable tap 98 when the switch is closed. Thus, each of coils 80, 81, 82 and 83 is connected to the source with the respective series resistor controlling the current in the coil (potentiometer 97 is effectively short circuited by the closed switches). The size of the series resistor, and coil turns can be designed to provide the appropriate flux depending on the type of change in wall thickness and the spacing of the coils, to present a substantially uniform and high density flux along the longitudinal direction of pipe 1. Accordingly, the pickup coil 8 will have a more uniform response to crack depth in the different wall thickness portions of the pipe 1 and the sensitivity of the pickup coil 8 to small cracks is significantly improved.

The mechanism employed for positioning the search coils within the drill pipe is as shown in FIG. 6. Centralizing cone 25 has a base diameter which exceeds the internal diameter of the drill pipe to be inspected. When centralizing cone 25 is positioned in the end of a drill pipe, it automatically centers itself axially with respect to the pipe. A shaft member 26 is slidably mounted in a disc 27 which in turn is rotatably mounted on the centralizing cone. An electric index motor 28 is rigidly mounted on the centralizing cone 25 by means of member 29. A portion of the periphery of disc 27 is provided with gear teeth so arranged as to mesh with the teeth of gear 30. Thus, as the shaft of index motor 28 rotates, disc 27 is rotated with respect to cone 25. An electric drive motor 31 is rigidly mounted on disc 27 by bracket 32. Shaft 26 is provided with a rigidly mounted drive rack 33, the teeth of which mate with the teeth of a gear 34 secured to the driven shaft of motor 31. Thus, as the shaft of drive motor 31 is rotated, shaft 26 is moved longitudinally with respect to cone 25.

Shaft 26 is provided with an end centering mechanism 35 which includes a collar 36 rigidly mounted on shaft 26 and a collar 37 slidably disposed on shaft 26. A roller 38 is rotatably mounted at the pivotal connection between arms 38a and 38b. Arms 38a and 38b are pivotally mounted on collars 36 and 37, respectively, at the ends of the arms not connected to the roller. Rollers 39, 40 and 41 are similarly connected between the collars by associated arms 39a, 39b, 40a, 40b, 41a, and 41b. A helical tension spring 42, surrounding shaft 26, is connected between the collars to urge slidably collar 37 toward stationary collar 36. Thus, rollers 38–41 are biased resiliently outwardly and are maintained at equal distances from the central axis of shaft 26, thereby centering the end of shaft 26 within a surrounding tubular member.

The shoe positioning mechanism 44 mounted on shaft 26 maintains the search shoes in their proper respective positions in regard to the inner surface of surrounding drill pipe. Each of the search shoes 45–48 contains a pick-up coil of the type shown in FIG. 8. The pickup coils are arranged so that the longer axis of the coil lies perpendicular to the longitudinal axis of shaft 26 and the plane of the coil is parallel to the longitudinal axis of the shaft. Each of the shoes 45–48 is mechanically connected between a stationary collar 49 and a slidable collar 50 by means of the pivotably connected arms, as shown. Collars 49 and 50 are stationary and slidable respectively with regard to shaft 26 and are interconnected by means of tension spring 51 which urges slidable collar 50 toward stationary collar 49. Thus, shoes 45–48 are biased outwardly and are maintained against the inner pipe surface at equal distances from the longitudinal axis of shaft 26. Shaft 26 comprises two sections, one supporting the end centering mechanism and shoe positioning mechanism and the other supporting the drive rack. These two sections are mechanically coupled by a disengageable coupling member 54 of conventional construction. This permits interchangeability of various shoe positioning and end centering mechanisms so that the apparatus can accommodate various size pipes.

When the unit shown in FIG. 6 is placed in operation, the end centering mechanism 35 and shoe positioning mechanism 44 are inserted into one end of the drill pipe and moved inwardly until centralizing cone 25 rests snugly against the end of the drill pipe. Drive motor 31 is then actuated to move shaft 26 rapidly inwardly of the drill pipe at a suitable constant speed so that the pickup coils contained in search shoes 45–48 will cut the lines of leakage flux emanating from the inner surface of the drill pipe. A linear speed of 50 feet per minute has been found to be sufficient to obtain the desired electrical signals from the pickup coils. Since the pickup coils cannot cover the entire surface of the pipe in a single pass, several passes are required if complete inspection of the inner surface of the drill pipe is desired. Accordingly, shaft 26 is subsequently retracted and index motor 28 is then actuated to rotate shaft 26 a suitable angular distance in preparation for a second pass. The unit is operated in this manner until the entire interior surface of the pipe has been inspected.

This shoe positioning apparatus is particularly useful for positioning the pickup coil employed in the embodiment illustrated in FIG. 1. Stationary electromagnetic coil 7 can be mounted on cone 25 and hence will be properly positioned surrounding the end of the drill pipe when the cone is positioned against the end of the pipe. The same shoe positioning apparatus can also be employed to properly position the pickup coils in accordance with the Fig. 3 embodiment. For this embodiment a potentiometer 52 having its rotary shaft connected to a gear 53 is added. The teeth of gear 53 are arranged to properly mate with teeth of rack 33. This arrangement permits changes of the potentiometer's effective resistance in accordance with the position of shaft 26, as is required in this embodiment.

Suitable mechanical structure for the embodiment illustrated in FIG. 2 is shown in FIG. 7. This apparatus includes a centralizing cone 60 with a slidably mounted shaft 61 and drive and index motors enclosed within housing 62, these components being essentially the same as in the apparatus shown in FIG. 6, including an end positioning mechanism and a shoe positioning mechanism (not visible).

An electromagnetic coil 63 is rigidly mounted in relation to cone 60 by means of four support members 64. A second electromagnetic coil 65 is rigidly mounted in relation to sliding shaft 61 by means of four parallel support members 66–69 and end structure 70. The length of support members 66–69 is adjusted so that soil 65 is transversely aligned with the pickup coils (not visible) mounted on shaft 61.

The tubular member 71 represents a portion of a drill pipe which is to be inspected and, during positioning, is advanced until it rests snugly against cone 60. Electromagnetic coil 63 is rigidly mounted on cone 60 and remains stationary with respect to the tubular member 71 once the cone is properly positioned. Electromagnetic coil 65 is mounted on slidable shaft 61 and, therefore, when the positioning motor means is housing 62 causes the search shoes to traverse the interior surface of tubular member 71, coil 65 simultaneously traverses the exterior surface.

The amplifier 11 and filter 12, shown in FIGS. 1–3, may be of a variety of different type units. The principle design criteria for the amplifier 11 is a bored frequency response to amplify to low and high frequencies of the signals produced by cracks in the inner surface of the drill pipe. The filter 12 is designed to pass the high frequency components of the crack signals and substantially cut off the low frequency components of the pit and non-uniform cross-section signals, to substantially prevent the low frequency signal components from activating the recorder 10. In addition, the amplifier and filter may be combined into a signal unit, where the filter is integral with the amplifier circuit, or an amplifier having a suitable frequency response can be used and the need for a separate filter thereby eliminated.

While several particularly advantageous embodiments of the present invention have been shown, the invention is by no means limited thereto. The present invention has utility in any situation where it is desired to detect discontinuities in the surface of ferromagnetic members having a non-uniform cross-sectional area. The scope of the invention is pointed out in more particularity in the appended claims.

What is claimed is:

1. In an inspection device for detecting discontinuities in the inner surface of a tubular ferromagnetic member, the combination of magnetic means for inducing longitudinal magnetic flux in the tubular member; and sensing means comprising a conical member having a base diameter greater than the inside diameter of the tubular member, a positionable unit extending slidably through the center of said conical member, said positionable unit including a centering means at one end so that when said conical member is positioned in the end of the tubular member and said centering means is within the tubular member the positionable unit is axially aligned within the tubular member, a plurality of magnetic-responsive means mounted on said positionable unit, means maintaining said magnetic-responsive means closely adjacent the inner surface of the tubular member to sense changes in leakage flux therefrom, and positioning means mounted on said conical member operative to control the axial and angular position of said positionable unit relative to said conical member.

2. An inspection device in accordance with claim 1 wherein said magnetic means comprises a single circular electromagnetic coil having an inside diameter greater than the outside diameter of the tubular member to be inspected, said coil being mounted on said conical member.

3. An inspection device in accordance with claim 2 wherein said magnetic means further comprises a second circular electromagnetic coil having an inside diameter greater than the outside diameter of the tubular member, said second coil being mounted on said positionable unit.

4. An inspection device in accordance with claim 1 wherein said positioning means comprises a drive means operative to cause said plurality of magnetic-responsive means to longitudinally traverse the inner surface of the tubular member, and index means operative to change the angular position of said plurality of magnetic-responsive means between successive longitudinal traverses.

5. In an inspection device for detecting discontinuities in a ferromagnetic member having a non-uniform cross section, the combination of
    electromagnetic means for inducing, in the ferromagnetic member, magnetic flux in a longitudinal direction,
        said electromagnetic means including at least one electromagnetic coil;
    means for maintaining said electromagnetic coil in a position concentric with that portion of the ferromagnetic member having the greatest cross section;
    a planar pickup coil;
    means
        for moving said pickup coil along the surface of the ferromagnetic member at a substantially uniform rate and in a longitudinal direction, and for maintaining the plane of said pickup coil parallel to the surface of the ferromagnetic member;

said pickup coil being elongated
to increase response to changes in leakage flux caused by discontinuities, and
to decrease the unavoidable response to changes in magnetic leakage flux caused by the non-uniform cross section, and circuit means connected to said pickup coil, said circuit means being
responsive to electrical signals from said pickup coil caused by discontinuities and
operative to reject electrical signals from said pickup coil caused by the non-uniform cross section.

6. An inspection device in accordance with claim 5 wherein said pickup coil is elongated in a direction perpendicular to the direction of travel.

7. An inspection device in accordance with claim 6 wherein said circuit means includes a filter circuit operative to pass the higher frequency components from said pickup coil caused by discontinuities and operative to reject the lower frequency components caused by the non-uniform cross section.

8. In an inspection device for detecting discontinuities in a ferromagnetic member having a non-uniform longitudinal cross section, the combination of
electromagnetic means for inducing, in the ferromagnetic member, nonalternating flux in a longitudinal direction, said electromagnetic means comprising at least
a stationary electromagnetic coil, and
a movable electromagnetic coil;
a pickup coil;
means for maintaining said stationary coil concentric with that portion of the magnetic member having the greatest cross section;
means
for moving said pickup coil along the surface of the ferromagnetic member at a substantially uniform rate while maintaining the axis of said pickup coil perpendicular to the longitudinal axis of the ferromagnetic member, and
for moving said movable coil while maintaining the same concentric with respect to the ferromagnetic member and in transverse alignment with said pickup coil;
said pickup coil being elongated
to increase response to changes in leakage flux caused by discontinuities and
to decrease response to changes in leakage flux caused by the non-uniform cross section; and
circuit means connected to said pickup coil, said circuit means being
responsive to electrical signals from said pickup coil caused by discontinuities and
operative to reject electrical signals from said pickup coil caused by the non-uniform cross section.

9. The method of detecting cracks in the upset end portion of drill pipe characterized by an annular portion of relatively large cross section bounded by other areas of lesser cross section, the cross section of any one of the other portions being not greater than that of a portion closer to said annular portion, said method comprising the steps of
inducing a longitudinal magnetic flux in the drill pipe by means of an electromagnetic coil which lies in a plane passing through said annular portion and which is concentric with said annular portion;
said longitudinal magnetic flux being induced in the drill pipe in a manner whereby decreases in the cross section of the drill pipe tend to increase the flux density in the portions of the drill pipe more distant from said annular portion; and
moving a search unit responsive to changes in magnetic leakage flux along a surface of the drill pipe to provide an indication of cracks in the drill pipe.

10. In an inspection device for detecting discontinuities in a ferromagnetic member having a non-uniform longitudinal cross section, the combination of
electromagnetic means for inducing a longitudinal magnetic flux in the ferromagnetic member, said means including
a stationary electromagnetic coil, and
a movable electromagnetic coil;
a search unit responsive to magnetic leakage flux for traversing the surface of the ferromagnetic member in a longitudinal direction at a substantially uniform rate;
circuit means connected to said search unit and operative to indicate the presence of discontinuities in the ferromagnetic member; and
means for positioning said movable coil so that said pickup coil and said movable coil are maintained in the same plane perpendicular to the longitudinal axis of the drill pipe.

11. In an inspection device for detecting discontinuities in a ferromagnetic member having a non-uniform longitudinal cross section, the combination of
electromagnetic means for inducing a longitudinal magnetic flux in the ferromagnetic member;
a search unit responsive to magnetic leakage flux for traversing the surface of the ferromagnetic member in a longitudinal direction at a substantially uniform rate;
circuit means connected to said search unit and operative to indicate the presence of discontinuities in the ferromagnetic member;
a direct current source of electrical energy; and
circuit means interconnected between said electromagnetic means and said source to control energization of said coil as a function of the search unit position.

12. In an inspection device for detecting discontinuities in a ferromagnetic member having a non-uniform longitudinal cross section, the combination of
a plurality of spaced apart electromagnetic coils disposed in parallel planes perpendicular to the longitudinal axis of the ferromagnetic member and operative to induce longitudinal magnetic flux in the ferromagnetic member;
a pickup coil for traversing the surface of the ferromagnetic member in a longitudinal direction and at a substantially uniform rate;
circuit means connected to said pickup coil and operative to indicate the presence of discontinuities in the ferromagnetic member;
a source of direct current electrical energy; and
circuit means interconnected between said electromagnetic coils and said source to vary the energization of the respective electromagnetic coils as a function of the pickup coil position so that the flux density in the vicinity of said pickup coil remains substantially constant regardless of the pickup coil position.

13. In an inspection device for detecting discontinuities in a ferromagnetic member having a non-uniform longitudinal cross section, the combination of
a plurality of spaced apart electromagnetic coils disposed in parallel planes perpendicular to the longitudinal axis of the ferromagnetic member and operative to induce longitudinal magnetic flux in the ferromagnetic member;
a pickup coil for traversing the surface of the ferromagnetic member in a longitudinal direction and at a substantially uniform rate;

circuit means connected to said pickup coil and operative to indicate the presence of discontinuities in the ferromagnetic member;

a source of direct current electrical energy; and circuit means interconnected between said electromagnetic coils and said source to energize the respective coils so that the flux density throughout the ferromagnetic member is substantially uniform.

References Cited by the Examiner

UNITED STATES PATENTS

| 2,563,254 | 8/51 | Lewis | 324—34 |
| 2,602,108 | 7/52 | Dionne | 324—37 |
| 2,758,276 | 8/56 | Foerster | 324—34 |
| 3,056,920 | 10/62 | Herrald | 324—37 |

RICHARD B. WILKINSON, *Primary Examiner.*

FREDERICK M. STRADER, *Examiner.*

UNITED STATES PATENT OFFICE
CERTIFICATE OF CORRECTION

Patent No. 3,209,243                             September 28, 1965

William T. Walters et al.

It is hereby certified that error appears in the above numbered patent requiring correction and that the said Letters Patent should read as corrected below.

Column 7, line 62, for "soil" read -- coil --; column 8, line 2, for "bored" read -- broad --; column 9, line 21, for the claim reference numeral "6" read -- 5 --.

Signed and sealed this 26th day of April 1966.

(SEAL)
Attest:

ERNEST W. SWIDER
Attesting Officer

EDWARD J. BRENNER
Commissioner of Patents